(12) United States Patent
Shapson et al.

(10) Patent No.: US 8,786,996 B1
(45) Date of Patent: Jul. 22, 2014

(54) METHODS AND DEVICES FOR PROTECTING CATV CIRCUITS FROM COMBINATION AND RING WAVES

(71) Applicants: Brian J. Shapson, Millstone Township, NJ (US); Jay F. Shapson, Millstone Township, NJ (US); Robert L. Romerein, Peterborough (CA)

(72) Inventors: Brian J. Shapson, Millstone Township, NJ (US); Jay F. Shapson, Millstone Township, NJ (US); Robert L. Romerein, Peterborough (CA)

(73) Assignee: Extreme Broadband Engineering, LLC, Hillstone Township, NJ (US)

( * ) Notice: Subject to any disclaimer, the term of this patent is extended or adjusted under 35 U.S.C. 154(b) by 0 days.

(21) Appl. No.: 14/087,044

(22) Filed: Nov. 22, 2013

(51) Int. Cl.
*H02H 9/06* (2006.01)

(52) U.S. Cl.
CPC ..................................... *H02H 9/06* (2013.01)
USPC .......................................................... 361/119

(58) Field of Classification Search
CPC .......................................................... H01T 4/08
USPC .......................................................... 361/119
See application file for complete search history.

(56) References Cited

U.S. PATENT DOCUMENTS

| | | | |
|---|---|---|---|
| 3,863,111 A | 1/1975 | Martzloff | |
| 4,633,359 A | 12/1986 | Mickelson et al. | |
| 4,747,789 A | 5/1988 | Gliha | |
| 5,198,958 A | 3/1993 | Krantz, Jr. | |
| 5,213,517 A | 5/1993 | Kerek et al. | |
| 5,215,478 A | 6/1993 | Briones | |
| 5,991,136 A | 11/1999 | Kaczmarek et al. | |
| 6,249,415 B1 | 6/2001 | Daoud et al. | |
| 6,450,836 B1 | 9/2002 | Youtsey | |
| 6,578,202 B1 * | 6/2003 | Holland | 725/127 |
| 6,644,994 B1 | 11/2003 | Lee | |
| 6,930,872 B2 * | 8/2005 | Palinkas et al. | 361/119 |
| 7,207,817 B1 | 4/2007 | Cheng | |
| 7,306,468 B2 | 12/2007 | Baker | |
| 7,463,471 B2 | 12/2008 | Frescaline et al. | |
| 7,470,131 B2 | 12/2008 | Hughes | |
| 8,125,752 B2 * | 2/2012 | Montena | 361/120 |
| 2007/0058319 A1 | 3/2007 | Frescaline et al. | |

* cited by examiner

*Primary Examiner* — Rexford Barnie
*Assistant Examiner* — Tien Mai
(74) *Attorney, Agent, or Firm* — Watov & Kipnes, P.C.; Kenneth Watov

(57) ABSTRACT

In a grounded electrically conductive housing for an electrical device, common electrically conductive connection points for one or more components connected thereto to be protected from harmful voltage surges, are provided with a spark gap formed between the connection points and ground, via either electrically conductive surge rods, electrode chips, or eyelets for conducting the voltage surges across the spark gap to ground thereby protecting the associated components from damage due to a voltage surge.

6 Claims, 18 Drawing Sheets

| INPUT SIGNAL FREQUENCY MHz | OUTPUT 12 | OUTPUT 14 | | | |
|---|---|---|---|---|---|
| 5 | -3.2 | -3.2 | | | |
| 15 | -3.3 | -3.3 | | | |
| 30 | -3.3 | -3.3 | | | |
| 40 | -3.3 | -3.3 | | | |
| 45 | -3.3 | -3.3 | | | |
| 54 | -3.3 | -3.3 | | | |
| 120 | -3.3 | -3.3 | | | |
| 200 | -3.3 | -3.3 | | | |
| 300 | -3.3 | -3.3 | | | |
| 450 | -3.5 | -3.4 | | | |
| 550 | -3.5 | -3.5 | | | |
| 750 | -3.7 | -3.6 | | | |
| 870 | -3.9 | -3.8 | | | |
| 1000 | -4.2 | -4.0 | | | |
| | | | | | |

FIG. 15

| INPUT SIGNAL FREQUENCY MHz | INPUT 10 | OUTPUT 12 | OUTPUT 14 | | |
|---|---|---|---|---|---|
| 5 | -30.7 | -27.6 | -27.8 | | |
| 15 | -29.6 | -34.9 | -35.2 | | |
| 30 | -30.3 | -38.3 | -38.5 | | |
| 40 | -30.9 | -39.7 | -39.7 | | |
| 45 | -31.2 | -40.1 | -40.2 | | |
| 54 | -31.7 | -41.2 | -41.0 | | |
| 120 | -34.0 | -49.5 | -45.8 | | |
| 200 | -36.1 | -51.4 | -43.8 | | |
| 300 | -37.1 | -55.6 | -40.6 | | |
| 450 | -32.1 | -49.3 | -36.1 | | |
| 550 | -31.0 | -39.2 | -35.1 | | |
| 750 | -30.4 | -31.7 | -37.1 | | |
| 870 | -33.6 | -31.0 | -37.2 | | |
| 1000 | -32.0 | -30.2 | -28.3 | | |
| | | | | | |

FIG. 16

| INPUT SIGNAL FREQUENCY MHz | OUTPUTS 12 & 14 | | | | |
|---|---|---|---|---|---|
| 5 | -32.8 | | | | |
| 15 | -41.5 | | | | |
| 30 | -47.8 | | | | |
| 40 | -47.9 | | | | |
| 45 | -47.5 | | | | |
| 54 | -47.3 | | | | |
| 120 | -48.7 | | | | |
| 200 | -53.1 | | | | |
| 300 | -47.7 | | | | |
| 450 | -39.0 | | | | |
| 550 | -36.3 | | | | |
| 750 | -36.7 | | | | |
| 870 | -42.1 | | | | |
| 1000 | -44.8 | | | | |
| | | | | | |

FIG. 17

| INPUT SIGNAL FREQUENCY MHz | OUTPUT 12 | OUTPUT 14 | | | |
|---|---|---|---|---|---|
| 5 | -3.3 | -3.3 | | | |
| 15 | -3.4 | -3.4 | | | |
| 30 | -3.4 | -3.4 | | | |
| 40 | -3.3 | -3.3 | | | |
| 45 | -3.3 | -3.3 | | | |
| 54 | -3.3 | -3.3 | | | |
| 120 | -3.3 | -3.3 | | | |
| 200 | -3.3 | -3.3 | | | |
| 300 | -3.4 | -3.3 | | | |
| 450 | -3.5 | -3.4 | | | |
| 550 | -3.5 | -3.5 | | | |
| 750 | -3.7 | -3.6 | | | |
| 870 | -3.9 | -3.8 | | | |
| 1000 | -4.1 | -3.9 | | | |
| | | | | | |

FIG. 21

| INPUT SIGNAL FREQUENCY MHz | INPUT 10 | OUTPUT 12 | OUTPUT 14 | | |
|---|---|---|---|---|---|
| 5 | -40.6 | -28.8 | -29.0 | | |
| 15 | -28.3 | -33.9 | -34.1 | | |
| 30 | -28.4 | -35.9 | -35.9 | | |
| 40 | -28.9 | -36.9 | -36.8 | | |
| 45 | -29.2 | -37.4 | -37.1 | | |
| 54 | -29.7 | -38.3 | -37.8 | | |
| 120 | -32.7 | -45.6 | -42.0 | | |
| 200 | -36.1 | -49.1 | -42.1 | | |
| 300 | -37.8 | -50.9 | -39.8 | | |
| 450 | -31.7 | -46.1 | -36.1 | | |
| 550 | -30.3 | -38.1 | -34.7 | | |
| 750 | -30.8 | -31.0 | -36.3 | | |
| 870 | -37.0 | -30.2 | -37.4 | | |
| 1000 | -33.5 | -30.1 | -29.3 | | |
| | | | | | |

FIG. 22

| INPUT SIGNAL FREQUENCY MHz | OUTPUTS 12 & 14 | | | | |
|---|---|---|---|---|---|
| 5 | -33.3 | | | | |
| 15 | -63.6 | | | | |
| 30 | -52.0 | | | | |
| 40 | -51.8 | | | | |
| 45 | -51.8 | | | | |
| 54 | -52.2 | | | | |
| 120 | -57.6 | | | | |
| 200 | -58.3 | | | | |
| 300 | -45.3 | | | | |
| 450 | -38.0 | | | | |
| 550 | -35.2 | | | | |
| 750 | -35.2 | | | | |
| 870 | -39.2 | | | | |
| 1000 | -49.1 | | | | |
| | | | | | |

FIG. 23

METHODS AND DEVICES FOR PROTECTING CATV CIRCUITS FROM COMBINATION AND RING WAVES

FIELD OF THE INVENTION

The present invention relates generally to methods and devices for protecting electrical circuitry from surge voltages and currents, and more particularly to protecting the circuitry associated with CATV devices, apparatus, and systems.

BACKGROUND OF THE INVENTION

A Cable TV system is exposed to environmental forces since it consists of metal clad coaxial cables and signal conditioning equipment that is physically spread throughout a geographical service area either aerially on utility poles or buried in the ground. One such environmental force is the discharge of atmospheric electrical charge known as lightening. It is well known that such charge currents can travel along the outer conductor of the coaxial cable, and that periodic connection of the cable to the power utility ground wire and also to ground rods buried in the earth are required to keep the power utility ground and the Cable System ground at the same voltage potential to insure public safety and protect subscriber equipment. However, currents that travel along the outer conductor of a coaxial cable will induce currents on the center conductor of the cable. These electrical disturbances on the center conductor of the coaxial cable, which may be induced by lightening discharge or by switching transients on the power grid, can damage the electrical components connected to the Cable TV system. Therefore, various methods of surge protection have evolved to keep power and communication utilities operating during atmospheric disturbances that may impact either network's distribution system at any point.

A standard developed by the Institute of Electrical and Electronic Engineers, based on empirical studies of typical voltage disturbances, defines standard voltage and current waveforms that any device in the Cable TV system or the electrical power grid may experience. The IEEE C62.41 1999 standard specifies service categories relative to the network architecture and defines the maximum voltage and current expected in these service categories.

Typically, devices connected to the CATV outside plant are classified as category B3 where the voltage may reach 6 kilovolts in an open circuit and the current into a short circuit may reach 3 kiloamps. The waveform is unipolar and is known as a "combination" waveform.

Devices connected inside the customer premises are usually classified as category A3 where the voltage may reach 6 kilovolts, but the waveform is a damped sinusoid known as a "ring" wave. Currents typically are limited by the impedance of the path to ground and typically may reach 500 amperes. These surge waveform standards make it possible to standardize and test the ability of a device in the network to survive the conditions expected for its position in the CATV network.

The Combination Wave is specified in paragraph 9.4.2 of IEEE C62.41. The 1.2/50-8/20 µs (microsecond) combination wave is defined by both an open circuit voltage waveform and a short circuit current waveform. The open circuit voltage waveform has a front time of 1.2 µs and duration of 50 µs (see FIG. 1). The short circuit current waveform has a front time of 8 µs and duration of 20 µs (see FIG. 2).

The Ring Wave is specified in paragraph 9.4.1 of IEEE C62.41. The 0.5 µs-100 kHz (kilohertz) ring wave has an initial rise time of 0.5 µs and an oscillating frequency of 100 kHz, where the frequency is calculated from the first and third zero crossing after the initial peak (see FIG. 3). The current associated with this voltage is determined by the source impedance, which is 12 ohms for a category A3 ring wave, and 2 ohms for a category B3 ring wave.

The methods used to protect devices connected to the CATV system depend upon several factors. First, the impedance of the protected circuit and the frequency at which it functions differentiate the types of surge protection devices that can be used effectively. Internal Power Regulators found in active circuits that require power such as amplifiers usually are protected by devices that function like zener diodes. These devices have a high impedance below a threshold voltage. This enables power to flow to the circuit without being affected by the protection device. Above this threshold voltage, current flows through the protection device to ground thus limiting further voltage rise that could be detrimental to the regulator circuit. Other threshold devices known as crowbar circuits become short circuits themselves when the threshold voltage is exceeded. The gas tube diode and triac semiconductor devices are in this group.

If the protected circuit is a path for high frequency signals, it is not possible to use these types of protection devices. With the exception of the gas tube, they all have a low impedance at radio frequencies that would shunt the communication signals to ground making the device ineffective under any condition. When powering an active device through a port that also carries radio frequency signals, an inductor must be in series with the power regulator input to mask its low impedance from the signal path with a high impedance at radio frequencies.

One common means of protecting a high frequency circuit from low frequency surges is to shunt the path with an inductor to ground that has a high impedance in the operating frequency range of the device but a low impedance below that frequency range. In a CATV system, the lowest frequency is 5 megahertz. A coupling capacitor typically follows the inductor in series with the signal flow into the device. The combination of the capacitor and inductor creates a simple highpass filter. Inductor values in this case are typically 6-8 microhenries and the capacitor value is typically about 1,000 picofarads.

But there are cases, especially in passive splitting devices, where the use of an inductor to protect the circuit is not desirable either because it introduces group delay at the lower band edge, or because it introduces extra cost in a competitive commodity market. In this case, the coupling capacitor takes the full impact of the surge. This places high demands upon the voltage breakdown rating of the dielectric in the capacitor. A high voltage capacitor with the temperature stability required to insure consistent signal parameters at low temperatures is typically larger than the economically sized housing of the device will allow.

SUMMARY OF THE INVENTION

In various embodiments of the invention, a surge rod or post of electrically conductive material is formed to be secured to and extend upward from an interior portion of a grounded electrically conductive housing of a device, with the free end of the rod being spaced from and opposing either a connection point on a PCB or the center conductor of an electrical contact protruding into the housing from an electrical port thereof, for example. The rod is electrically connected to the housing. A spark gap is provided within the space or separation between the free end of the rod and the connection point or center conductor of the electrical contact, whereby voltage surges that would otherwise damage circuitry connected to the connection point or the center conductor are protected by the discharge of the voltage surge therefrom across the spark gap, and through the surge rod to ground via the housing. Similarly, any other connection point on a PCB can be protected from voltage surges through use of a surge rod extending from the housing to a spark gap opposing the connection point.

In a second embodiment of the invention, the surge rod has one end electrically secured to a connection point or an electrical contact of a printed circuit board (PCB), with the electrical contact also being electrically connected to electrical components to be protected from voltage surges, such as a capacitor included in a high pass filter in a passive splitter device. The free end of the surge rod is spaced from an interior wall of the housing to form a spark gap therebetween for protecting the electrical circuitry on the PCB, and/or a coupling capacitor as previously described. Similarly, any other electrical contact of a PCB can be protected from voltage surges to prevent damage to circuit components associated with the electrical contact or connection point.

Other embodiments of the invention include an electrode secured to an edge of a PCB, electrically connected to a connection point on the PCB associated with components to be protected, whereby the electrode is spaced from an opposing wall of the housing to provide a spark gap therebetween. Yet another embodiment includes two spaced apart electrically conductive eyelets secured to a PCB, with one eyelet being grounded, and the other eyelet being electrically connected to a connection point on the PCB connected to components to be protected. The eyelets are spaced apart to form a spark gap therebetween.

BRIEF DESCRIPTION OF THE DRAWINGS

The various embodiments of the present invention are described below with reference to the drawings, wherein like items are identified by the same reference designation. The drawings are briefly described immediately below.

FIGS. 15, 16, and 17 are charts tabulating test results associated with the curves of FIGS. 12, 13, and 14, respectively;

FIGS. 21, 22, and 23 are charts tabulating test results associated with the curves of FIGS. 18, 19, and 20, respectively.

DETAILED DESCRIPTION OF THE INVENTION

Figure 1:
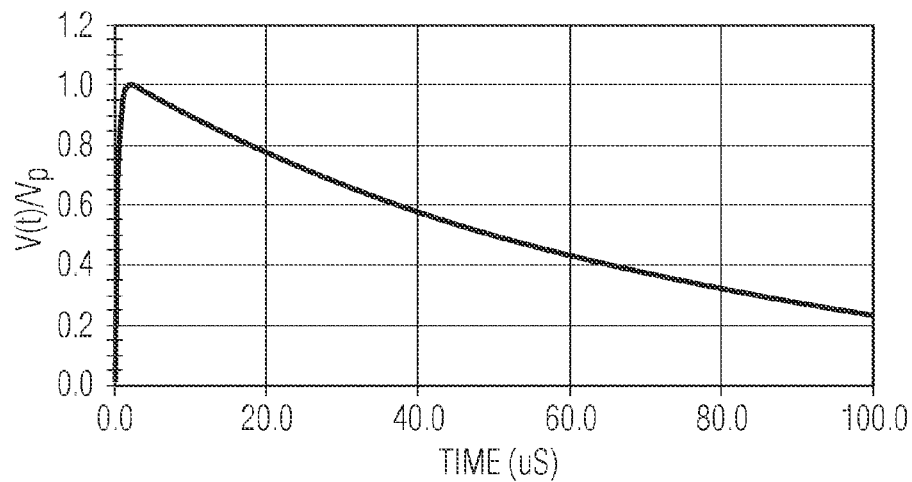
FIG. 1 is a diagram showing an example of a combination waveform open circuit voltage.
Figure 2:
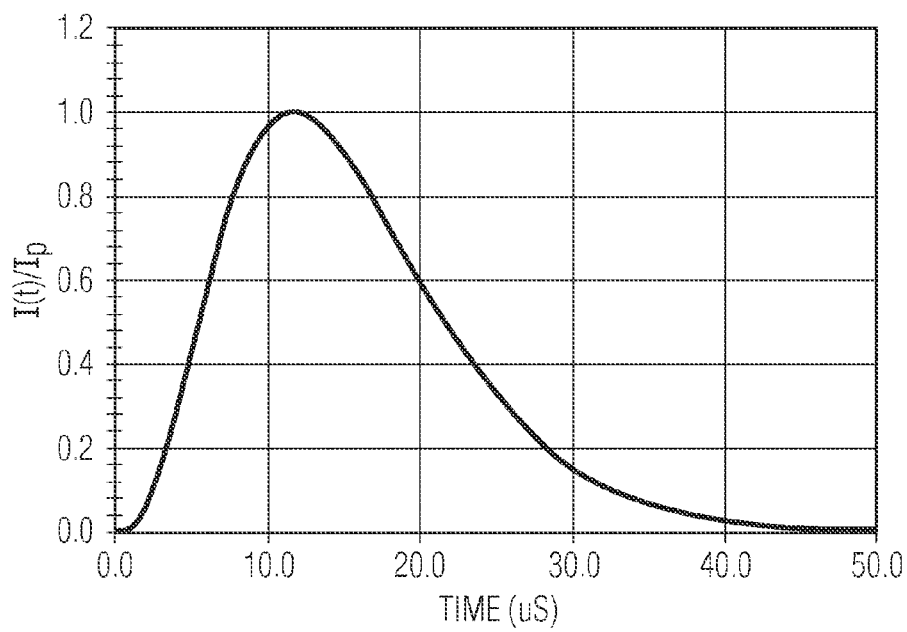
FIG. 2 is a diagram showing an example of a combination waveform short circuit current.
Figure 3:
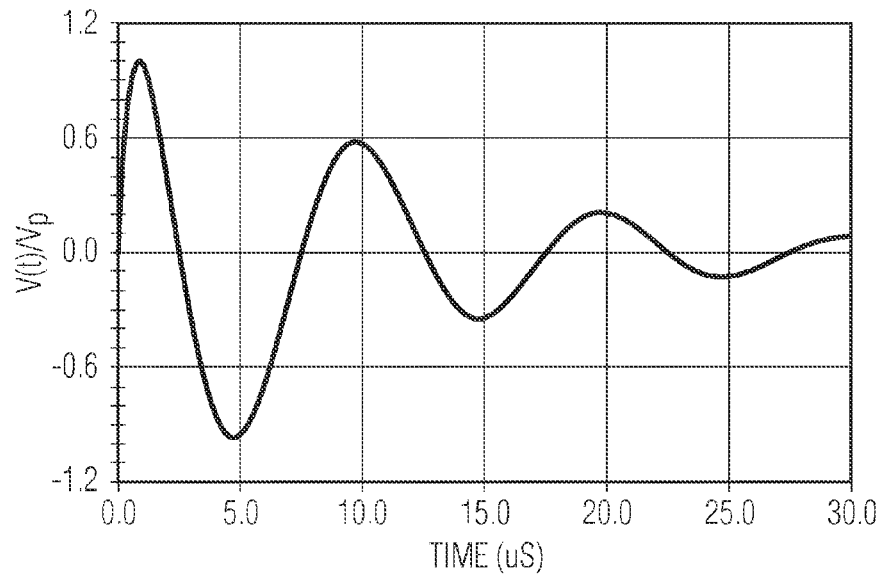
FIG. 3 is a diagram showing a 100 kHz ring wave voltage waveform.
Figure 4:
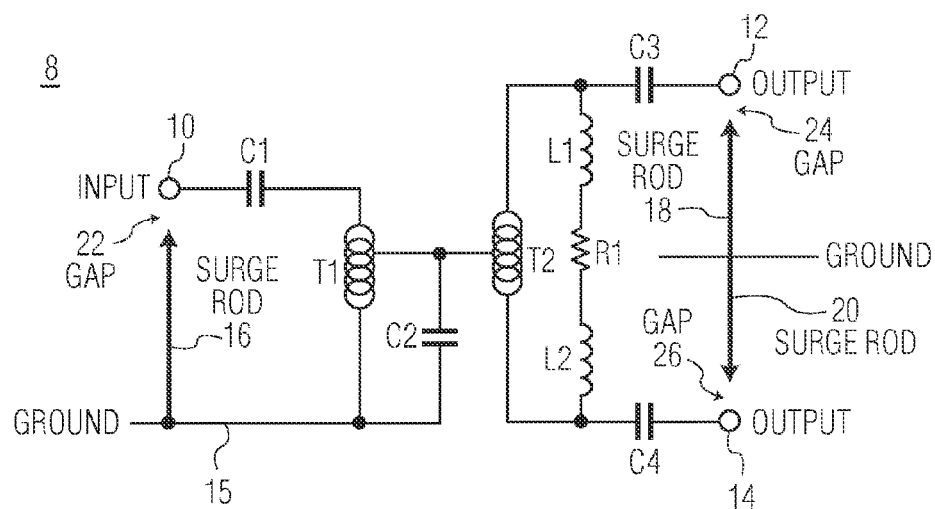
FIG. 4 is a generalized circuit schematic diagram of a typical 2-way splitter circuit that includes spark gaps to protect coupling capacitors C1, C3, and C4, from voltage surges, in accordance with various embodiments of the invention.

A typical 2-way splitter circuit 8 is shown in FIG. 4. The various embodiments of the present invention can be employed to particularly protect capacitors C1, C3, and C4 from destruction by the magnitude of the surge voltages that may occur at their associated Input port 10, output port 12, and output port 14, respectively, through use of surge rods 16, 18, and 20, respectively. Similarly, any other port or circuit connection point of any other electrical device or apparatus can be protected against voltage surges. Through use of the various embodiments of the present invention in a 2-way splitter 8 of FIG. 4, capacitors C1, C3, and C4 can be employed each with a lower voltage rating and smaller size by using lightning or surge rods 16, 18, and 20, respectively, to arrest excess voltage before passing through the associated capacitors. Tests conducted by the inventors have shown that without the use of the surge rod 16, once the dielectric of capacitor C1 breaks down, current passes directly to ground through the transformer T1 comprising the signal processing circuit and the capacitor may explode due to the sudden heating of its ceramic body.

The diagram of a typical 2-way splitter 8 of FIG. 4 used extensively in many CATV systems shows the relationship of the coupling capacitors C1, C3, C4 to the core of the circuit that splits an input signal into two output signals. The connection of T1 directly to the grounded housing 15 provides a current path through the transformer windings from any port 10, 12, 14, if the coupling capacitor C1 breaks down. This current is also damaging to the ferrite cores that the transformers T1 and T2 are built around. Magnetization of the associated core produces non-linear signal distortion that introduces a phantom signal at twice the frequency of the fundamental. This is known as second harmonic distortion. By shunting the surge to ground through use of surge rods 16, 18, and 20, before the surge voltage can discharge through the transformer windings, the degree of magnetization and thus the distortion is substantially reduced.

Figure 5:
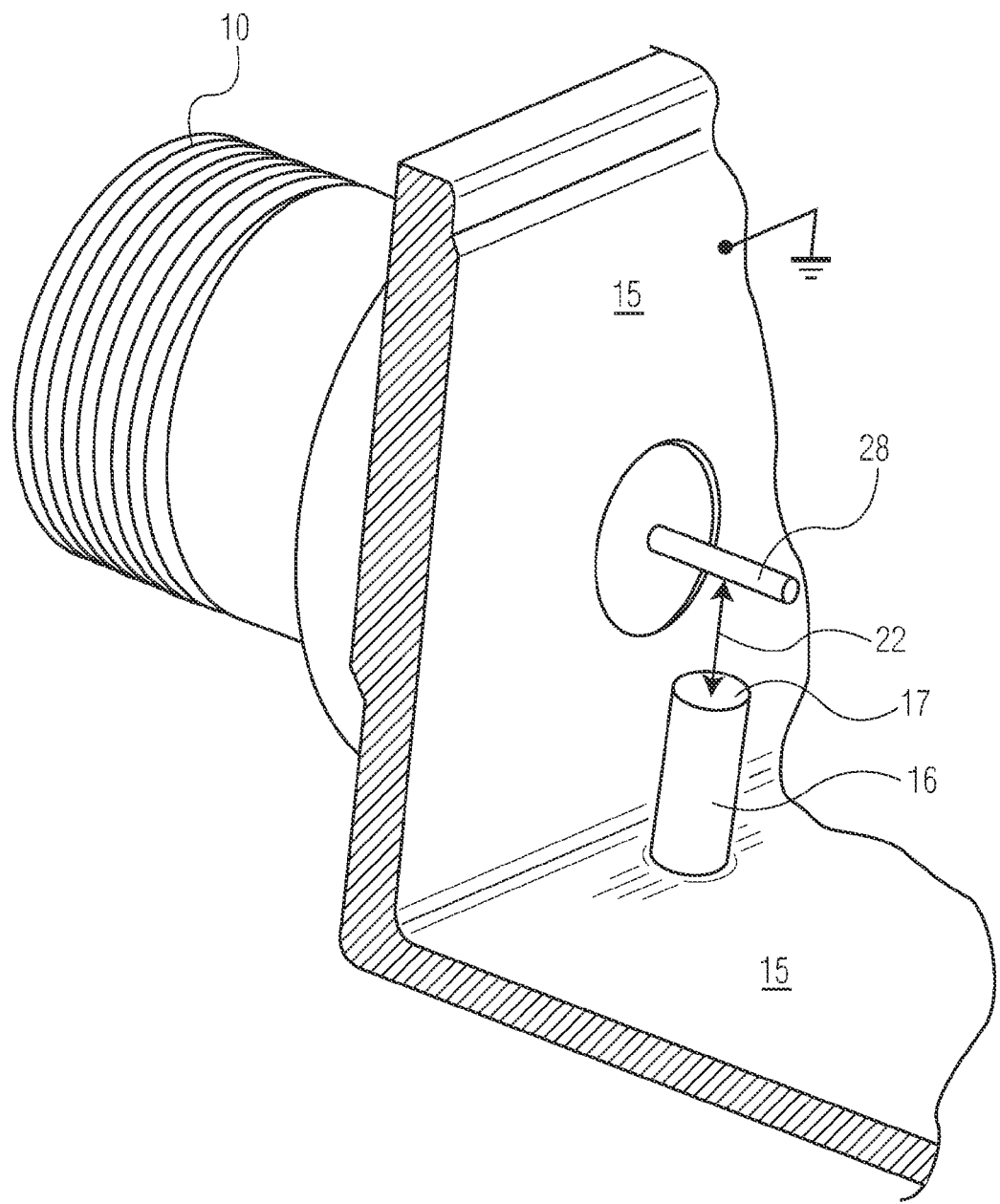
FIG. 5 is a partial pictorial cutaway view of a first embodiment of the invention.

There are a number of inventive embodiments to accomplish an effective surge rod. The first method or embodiment inferred in FIG. 4, shows surge rods 16, 18, and 20 protruding upward from the housing 15 to form a spark gap 22, 24, 26, respectively, with the tail or tab of an associated connector that connects the coaxial cables (not shown) with the associated ports 10, 12, 14, respectively, for example. Surge voltages are thereby discharged via surge rods 16, 18, 20 to ground, thereby preventing the voltage ratings of the associated capacitors C1, C3, and C4 from being exceeded. More specifically, the first embodiment of the invention is shown in FIG. 5, which is a partial cutaway view of the typical splitter 8 of FIG. 4. As shown, looking into the housing 15 portion where a center conductor 28 of an input connector port 10, in this example, protrudes into the interior of the housing 15 for electrical connection to a printed circuit board PCB (not shown). In this example of use of the first embodiment of the invention in a splitter 8, a surge rod 16 is electrically connected and secured at one end to a grounded metallic and electrically conductive housing 15, as shown. In this example the surge rod 16 is made from tin plated brass, and is formed from a solid rod, having an outside diameter ranging from 1 mm (millimeter) to 2 mm. The free end 17 of the surge rod 16 is spaced apart from a position to directly oppose the center conductor 28, as shown, for forming a spark gap 22. The housing 15 is connected to ground, whereby if a voltage surge of greater than a predetermined value occurs on center conductor 28, the surge arcs over from the center conductor 28, across the spark gap 22, and through the surge rod 16 to ground via grounded housing 15. Note that this first and other embodiments of the invention is not meant to be limited to use in CATV splitter devices 8, and can otherwise be employed to protect circuit connection points of other devices or apparatus from voltage surges. Such protection can be provided at any circuit connection point, and is not limited to protecting signal input connections.

Figure 6A:
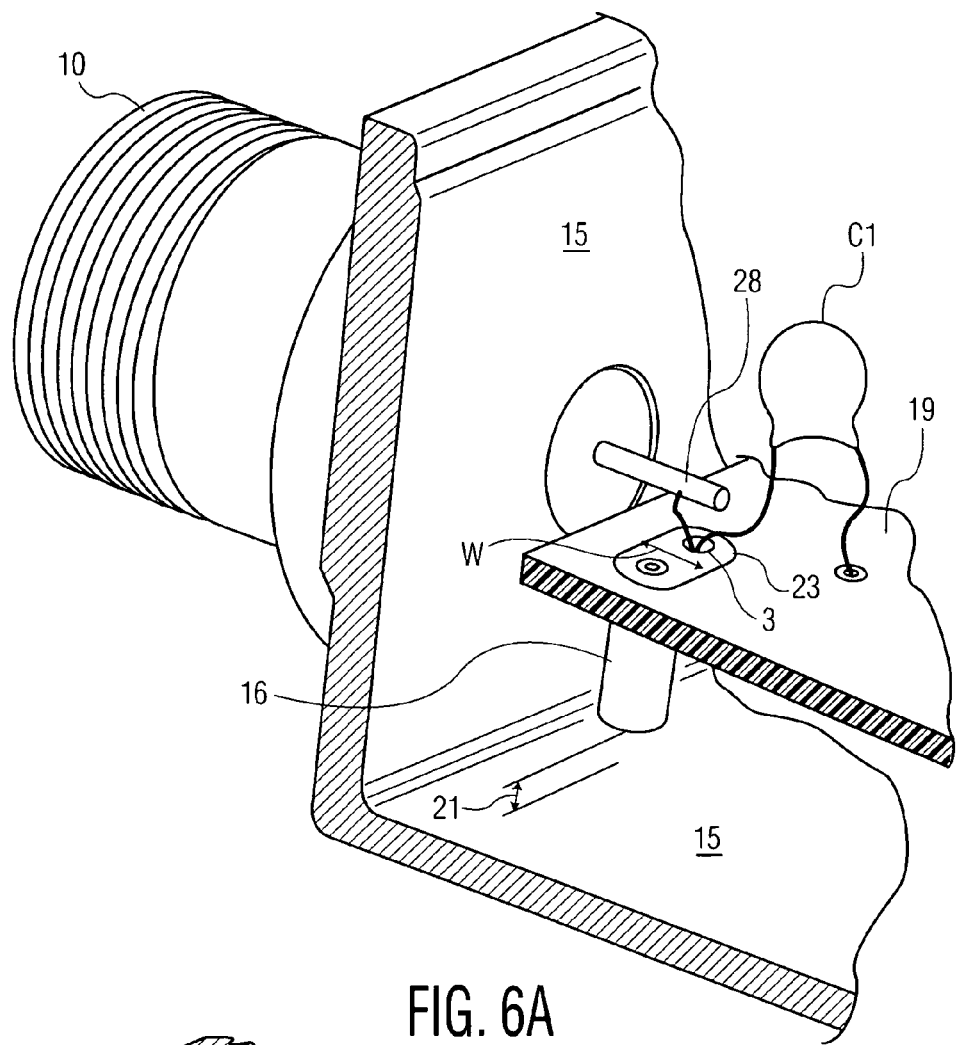
FIGS. 6A, 6B, and 6C are partial pictorial cutaway views of a second embodiment of the invention.
Figure 6B:
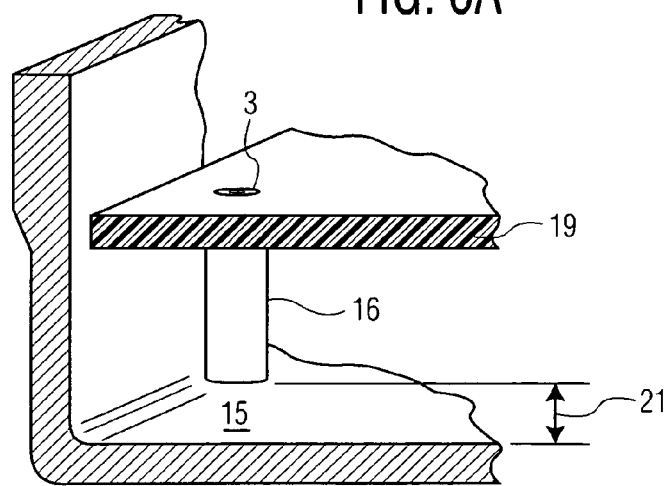
Figure 6C:
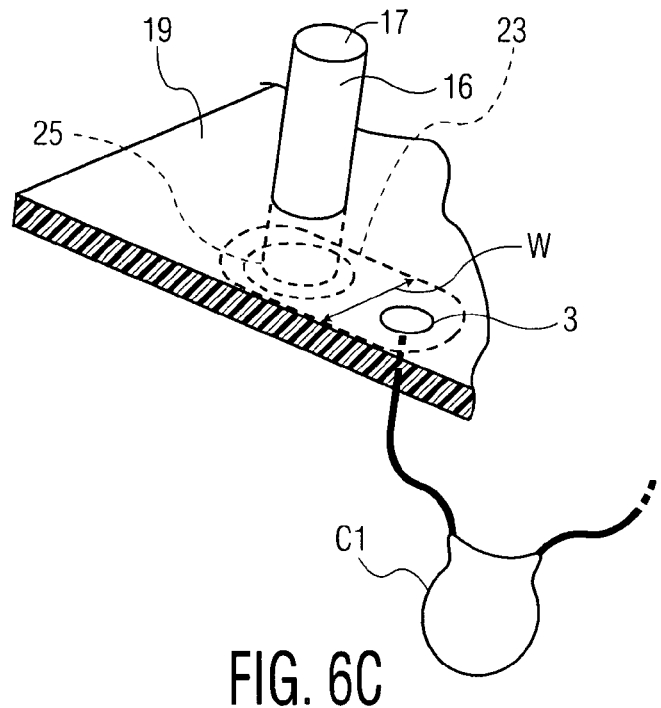

In another embodiment of the invention as previously described, and more specifically shown in FIGS. 6A, 6B and 6C, each representing a partial cutaway view of a splitter 8, in this example. A surge rod 16 has one end secured to and electrically connected to a circuit connection point 3 to be protected on an associated PCB 19, with the free end of the surge rod 16 extending toward and spaced apart from the housing 15 to create a spark gap 21 therebetween. Surge voltages occurring at connection point 3 are discharged through surge rod 16, across the spark gap 21 to ground via housing 15. In this embodiment, the copper trace conducting the surge current must be of sufficient width W to conduct the current without itself self-destructing. FIG. 6C is a partial cutaway view looking toward the bottom of the PCB 19, showing that a copper pad 23 is relatively wide compared to typical conductive circuit tracings on a PCB 19. The copper pad 23 is electrically and mechanically secured to one end of surge rod 16, and by via 25 (a plated through hole) to circuit connection point on the top of PCB 19 (typically by soldering). The width of the copper pad 23, in this example, was 2 mm, and the thickness of the copper cladding on the circuit board is typically 0.1 mm thick. As indicated, tests made by the inventors have shown that the width of copper traces need to be short and wide to be able to survive the high current of the category B3 surges. The inventors found that by insuring that the copper pad 23 on the PCB was at least 2 mm wide, for the splitter 8 of FIG. 4, and soldering the associated surge rod 16 to the pad 23, with the PCB 19 circuit connection point 3 also electrically connected to the associated capacitor C1 in this example, no damage occurred to PCB pad 23 during the occurrence of combination or ring surges. This alternative embodiment has the advantage of lower cost and reduced labor impact, when compared to the previously described embodiment, but it is more difficult to control the spark gap tolerance due to the presence of soldering and the orientation of the flat part of the surge rod 16. Although the surge rod 16 can be placed at any port to protect the associated coupling capacitor, in a splitter such as but not limited to splitter 8, it should be noted that the input port 10 usually is more susceptible to a high energy B3 combination surge since it may be connected to the outside CATV main feed cable.

Figure 7:
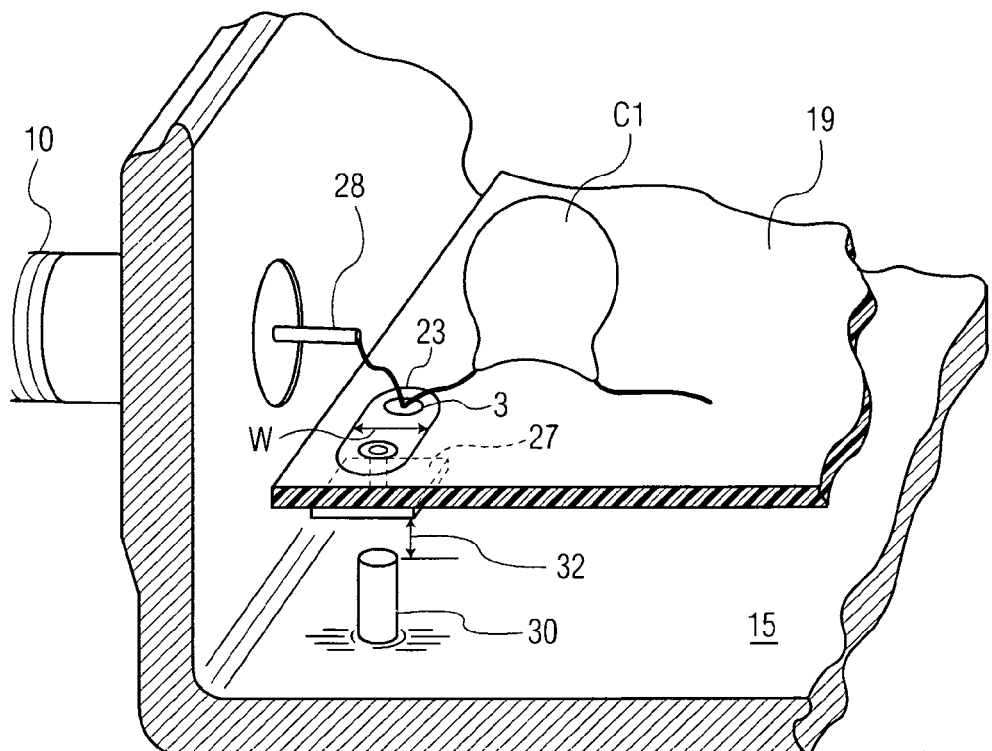
FIG. 7 is a pictorial diagram of a partial cutaway view for a third embodiment of the invention.

In a third embodiment of the invention, as shown in FIG. 7, a surge rod 30 is secured at one end to the grounded housing 15, while insuring electrical connection therebetween. The free end of the surge rod 30 is spaced from a connection point 3, in this example, to form a spark gap 32 therebetween, as shown. Otherwise, the surge protection provided by this embodiment of the invention is substantially the same as that described above for other embodiments of the invention. As shown in this example, as in FIG. 5, FIG. 7 shows a center conductor or input electrode 28 from port 10 electrically connected to the connection point 3, which is also connected to one end of the capacitor C1, in this example, on the PCB 19. In addition to copper pad 23 on the top of PCB 19, another thick copper pad 27 is secured to the bottom of PCB 19 as shown, for enhanced reliability.

Figure 8A:
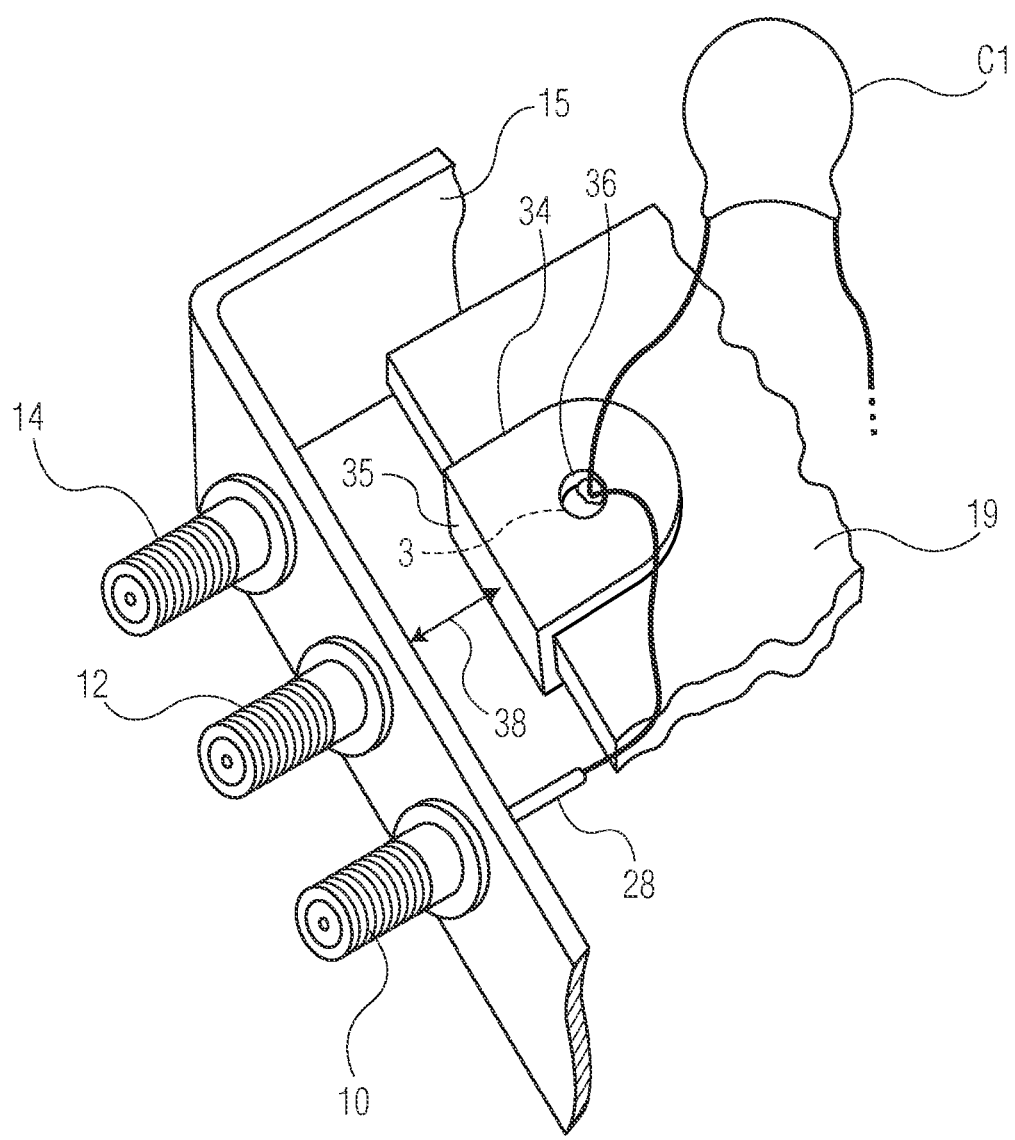
FIGS. 8A, 8B, and 8C are pictorial views for a fourth embodiment of the invention.
Figure 8B:
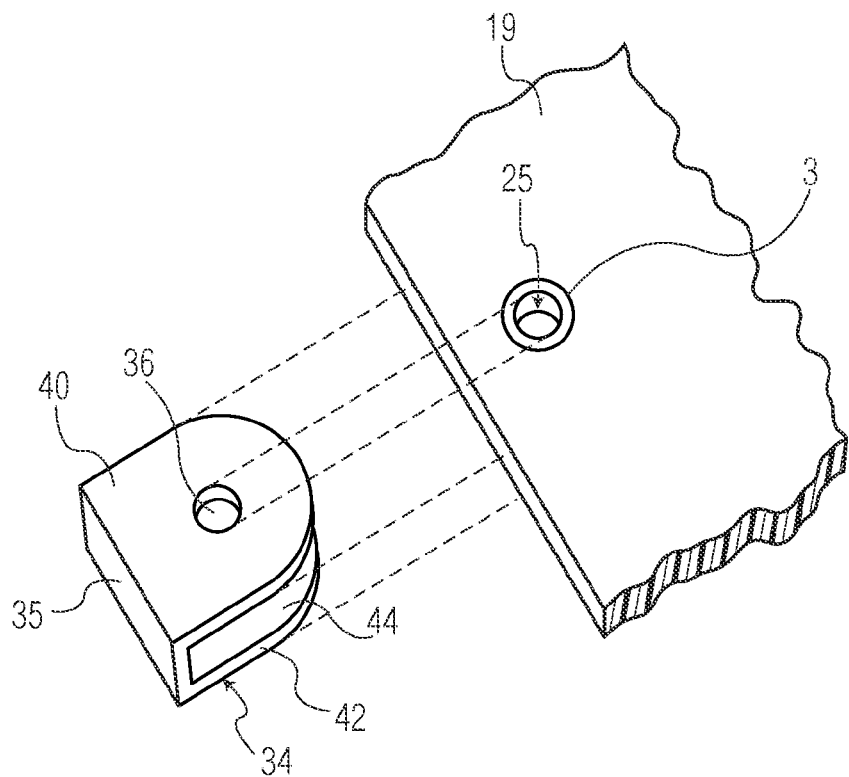
Figure 8C:
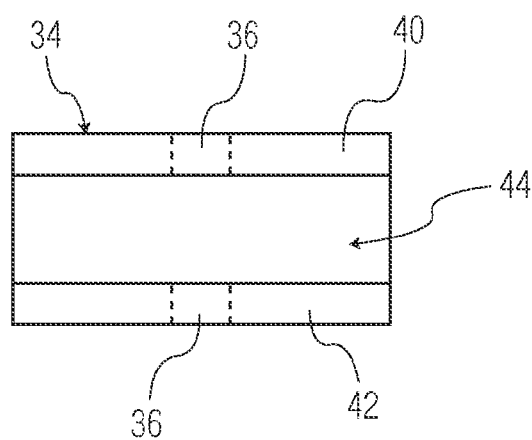

A fourth embodiment is shown in FIGS. 8A through 8D. As shown, the fourth embodiment of the invention includes a tin-plated brass U-shaped electrode 34 that is secured to the PCB 19, as shown. Outer edge 35 of the U-shaped electrode 34 is parallel to an opposing sidewall of housing 15, in this example, forming a spark gap 38 therebetween. A centrally located hole 36 on a top portion of the electrode clip 34 provides for soldering to connection point 3, and also attaching an end of capacitor C1 thereto, and a conductor 28 from port 10 thereto, as shown. Clip electrode 34 is U-shaped, and has a top portion 40 and bottom portion 42 spaced apart from one another for forming a slotway 44 as shown. The clip electrode 34 is pushed onto to the PCB 19 as shown in FIG. 8B, with the hole 36 of clip electrode 34 positioned directly over the connection point 3 of PCB 19. The connection point 3 is provided by via 25 (see FIG. 6C) on top and bottom portions of the PCB 19, whereby clip 34 also includes other centrally located throughhole portion 36, as shown in FIG. 8C.

Figure 9A:
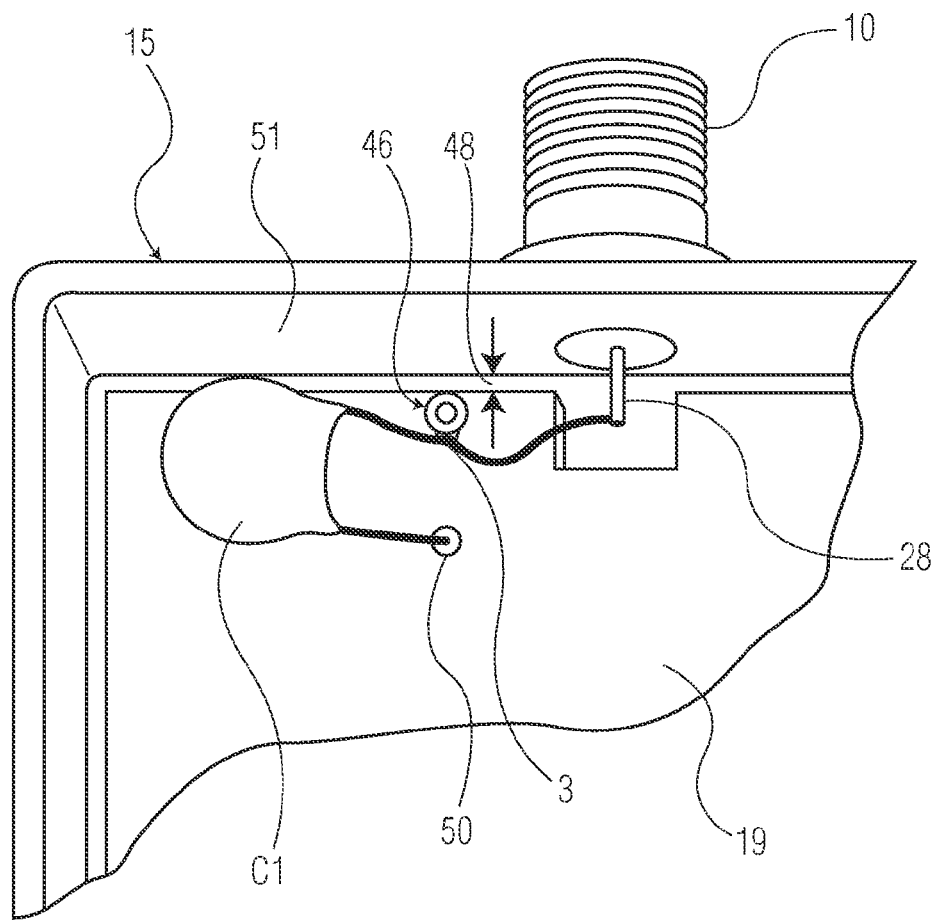
FIGS. 9A, 9B, 9C, and 9D are pictorial, top plan, side elevational, and exploded assembly views, respectively, for a fifth embodiment of the invention.
Figure 9B:
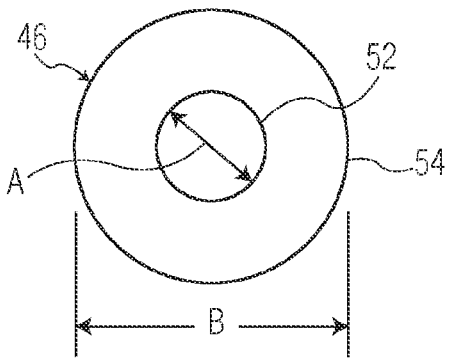
Figure 9C:
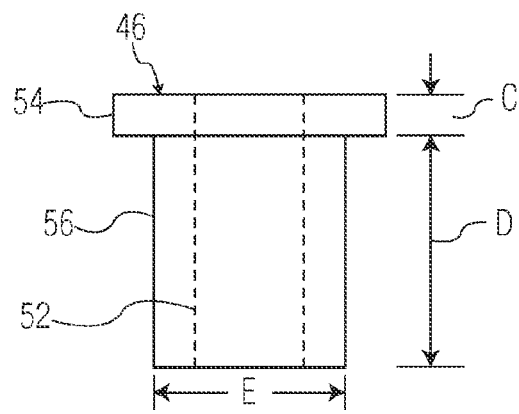
Figure 9D:
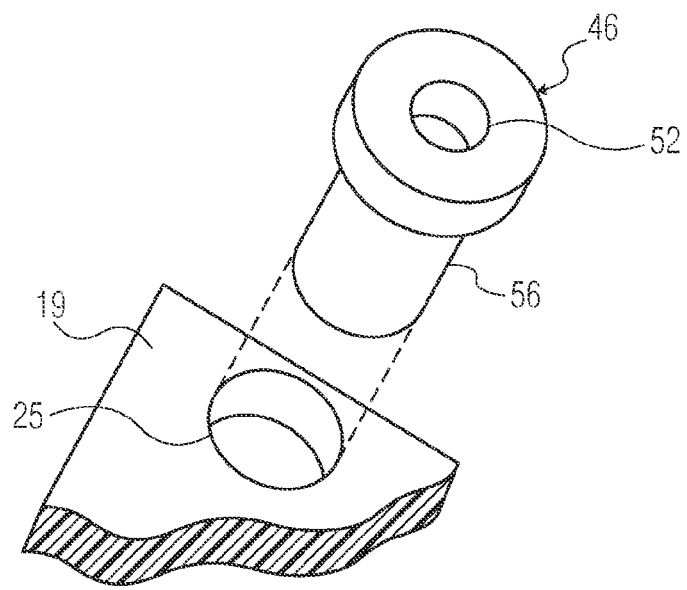

A fifth embodiment of the invention is shown in FIG. 9A, includes an eyelet 46 mounted upon PCB 19 electrically connected to connection point 3. Eyelet 46 is positioned opposing a wall 51 of housing 15 for forming a spark gap 48 therebetween. As shown, a capacitor C1 is connected between connection point 3 and another connection point 50 on PCB 19, with connection point 3 also being electrically connected to center conductor 28 of port 10. The eyelet 46 is formed from tin-plated brass material in this example. As shown in FIGS. 9B and 9C, the eyelet 46 has a centrally located hole 52. In this example, centrally located hole 52 has a diameter A of 0.8 millimeter (mm), and an outside diameter B of 2.0 mm. Eyelet 46 is T-shaped, as shown in FIG. 9C, includes a topmost portion 54, and a lowermost portion 56 that is narrower than the topmost portion 54. The topmost portion 54 has a thickness C of 0.3 mm, whereas the narrowed circular portion 56 has a length D of 1.7 mm, and an outside diameter E of 1.4 mm. Note that the dimensions given for the eyelet 46 are not meant to be limiting, and are provided from dimensioning used in a prototype of the invention by the inventors to test the same for the fifth embodiment illustrated. FIG. 9D is an exploded assembly view showing that the hub portion 56 of eyelet 46 is secured in a via-hole 25 of PCB 19, and electrically connected thereto. The eyelet 46 is typically inserted into the PCB 19 by a machine and the leading end of the eyelet 46 is rolled to create a flange that fastens it securely to the PCB 19 prior to soldering.

Figure 10:
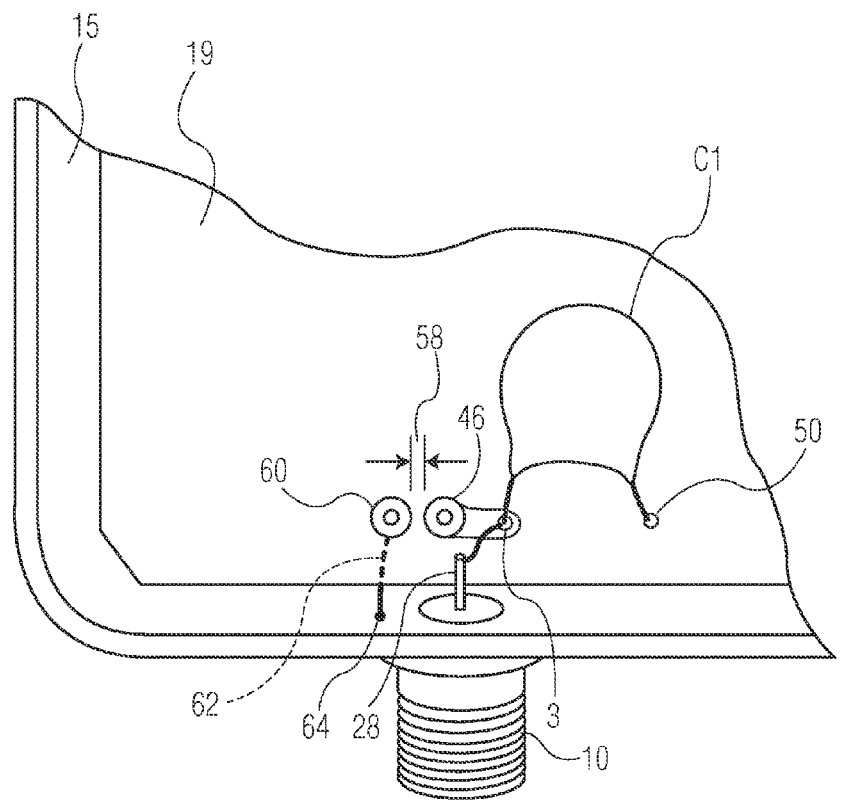
FIG. 10 is a partial cutaway pictorial view of a sixth embodiment of the invention.

A sixth embodiment of the invention is shown in FIG. 10. This embodiment includes eyelet 46, and an identical second eyelet 60 secured to the PCB 19 in a spaced apart relationship. The spacing between eyelets 46 and 60 provides a spark gap 58, as shown. Eyelet 46 is connected to connection point 3, with one end of capacitor C1, the other end of the latter being connected to connection point 50 on PCB 19. Eyelet 60, in this example, has the identical design to that previously described for eyelet 46. Eyelet 60 is electrically connected to ground, either via a ground plane (not shown) associated with PCB 19, or via a direct electrical connection provided by an electrical lead 62 or PCB 19 mounting boss shown in phantom between eyelet 60 and an electrical connection point 64 on housing 15.

Figure 11:
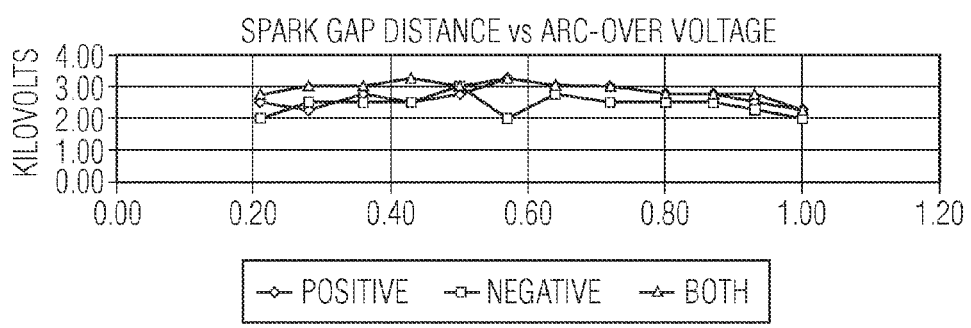
FIG. 11 is a curve showing for the second embodiment of the invention spark gap dimensions in millimeters versus different voltage surges in kilovolts for combination waves, for positive, negative, and both polarities.

The preferred gap dimension for the six embodiments of the invention was determined by testing a series of gap distances to quantify the spark-over or surge voltage with respect to gap distance. The surge voltage was applied to the port and was increased incrementally by 500 volts to a maximum of 6 kV. The voltage where spark-over occurred was noted as shown in the curve of FIG. 11. As shown, the voltages at which the spark arcs over are recorded with respect to the gap distance 22 between the surge rod 16 and the center conductor 28 of port 10, for example. The results are shown for the polarity of the respective voltage when the spark over arcs occurred. Carbon residue formed each time there was an arc. Note that a gap of 1 mm appears to arc at a lower voltage than a gap of 0.5 mm. This is due to the build-up of carbon on the circuit board in the gap. This effect was repeatable. When a given gap was tested by incrementally increasing the voltage until it fired, the initial spark over voltage was higher than the spark over voltage after numerous discharges to test the durability of the spark gap. This indicates that the spark gap surge protection means in all of the embodiments of the invention actually improves with repeated arcing. From previous experiments, the ring wave did not cause damage to the device under test, even with a 50V spark gap type capacitor at the associated input port 10. The combination waveform can deliver surge energy that damages the coupling capacitor, in this example. In other words, the use of a surge rod, of the present invention, is more effective in protecting against the effects of the more damaging type of discharge. A 500 volt capacitor used in these surge tests survived surges up to 6 kV @ 3 kA.

A side by side RF performance data comparison shows no significant change in insertion loss. Changes observed in return loss in high frequency voltage surge tests (see below) might come from the anticipated repetitive soldering, which inevitably affects RF performance in higher frequencies. Further tests of multiple prototypes have verified this explanation. For CATV splitter 8 devices, the inventors determined that a 0.8 mm spark gap is preferred for various embodiments of the invention. The inventors also determined that a standard capacitor (non spark gap type) with at least a 500 volt dielectric rating can be used in conjunction with a surge rod for reliable 6 kV/3 kA combo surge survival. It is expected that the same result will be obtained for the other embodiments of the invention.

Figure 12:
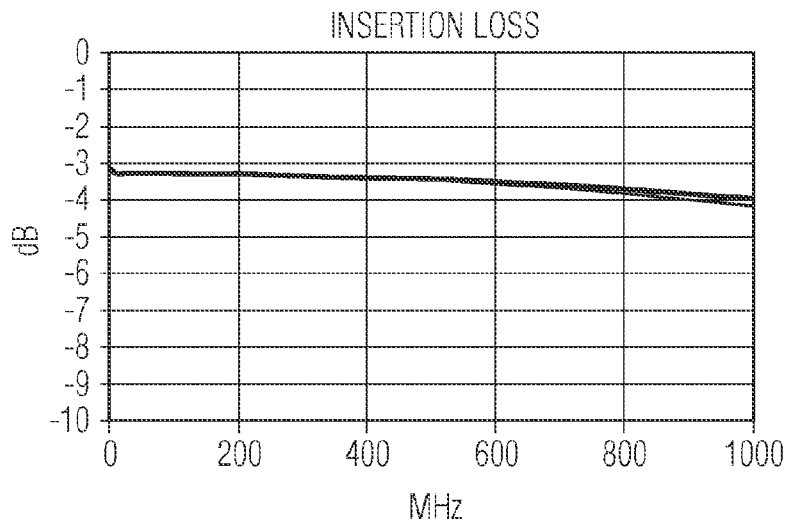
FIGS. 12, 13, and 14 show curves or graphs before surge voltage occurrence for insertion loss, return loss, and isolation, respectively, each plotting DB versus frequency in megahertz.
Figure 13:
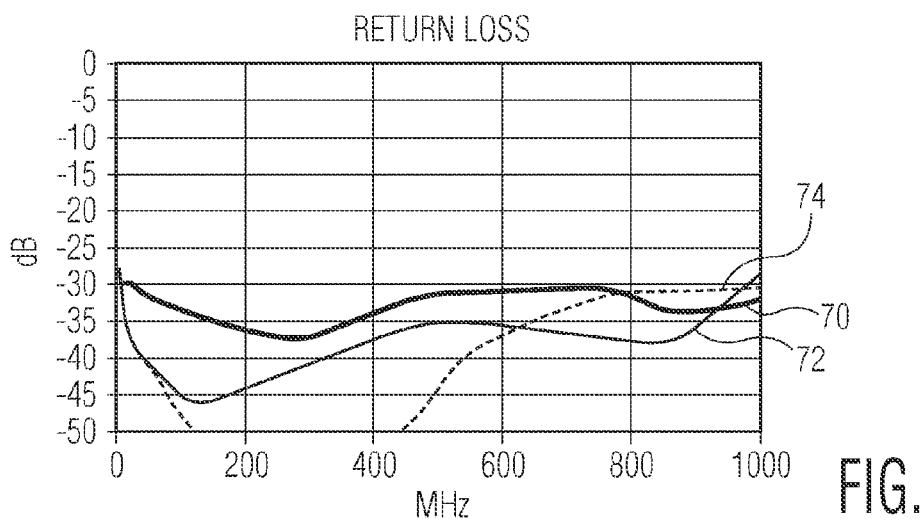
Figure 14:
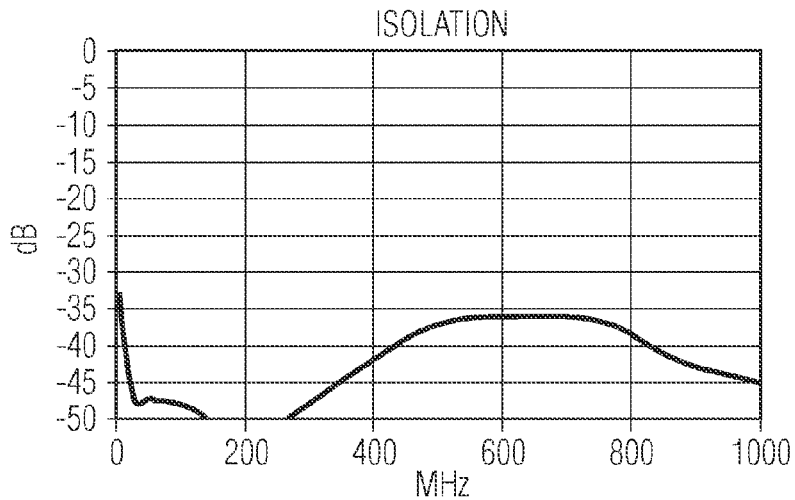
Figure 18:
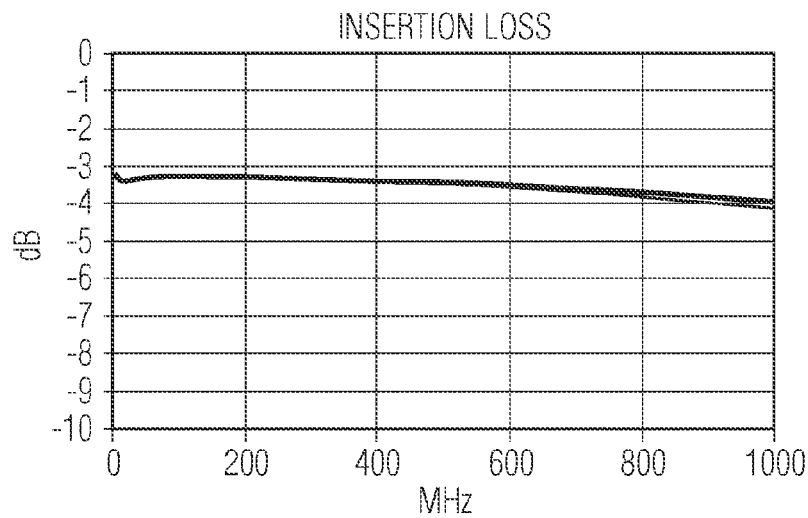
FIGS. 18, 19, and 20 show curves or graphs after surge voltage occurrence for insertion loss, return loss, and isolation, respectively, each plotting DB versus frequency in megahertz.
Figure 19:
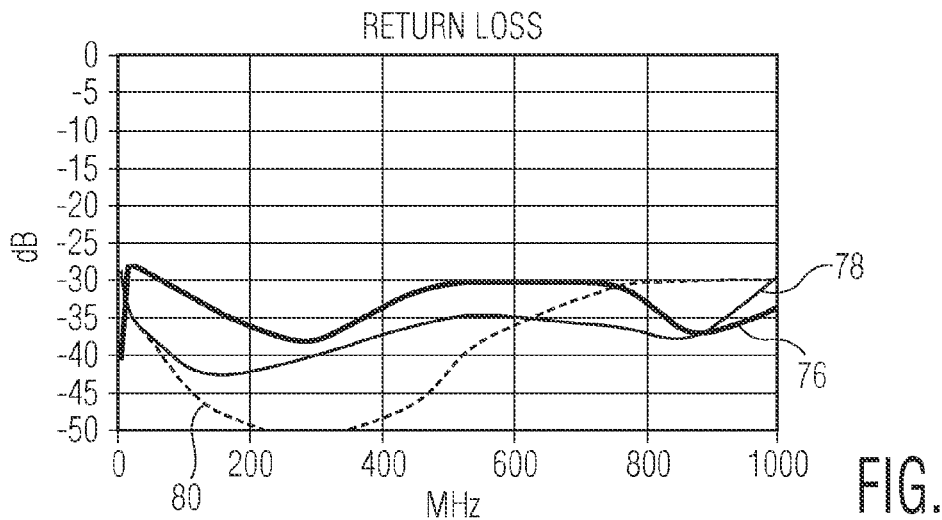
Figure 20:
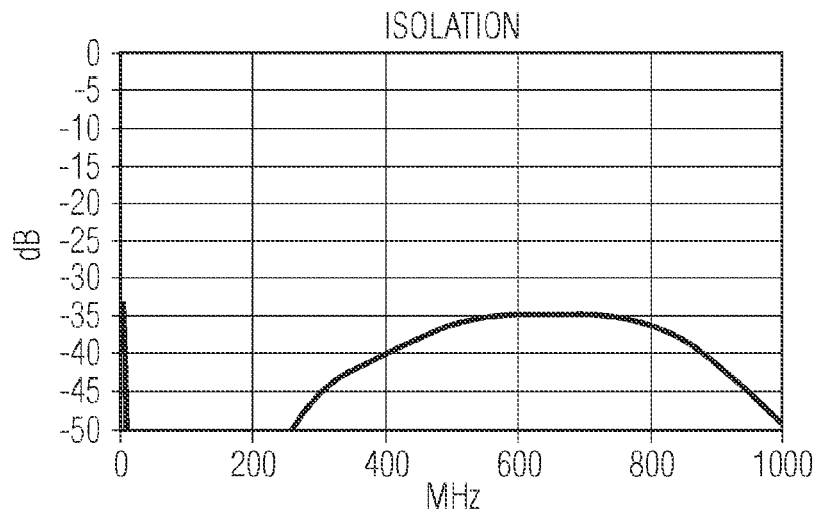

FIGS. 12, 13, and 14, show curves of insertion loss, return loss, and isolation, respectively, for tests made before applying a surge voltage at the input port 10 using the first embodiment of the invention in a typical CATV splitter 8 circuit as shown in FIG. 4. FIGS. 15, 16, and 17 are tables showing test results before surge for insertion loss, return loss, and isolation, respectively. FIGS. 18, 19, and 20, show curves of insertion loss, return loss, and isolation, obtained from applying 6 kV (kilovolts) combination voltage surges to the input port 10. FIGS. 21, 22, and 23 are tables showing test results after applying surge voltages for insertion loss, return loss, and isolation, respectively. It was observed that damage from surge voltage to capacitor C1, for example, occurred mainly in the low frequency range 5 Mhz to 30 MHz.

The spark gap embodiments of the present invention are intended to prevent damage to an associated capacitor connected to an associated port. The fact that the inventors observed minimal change to the low frequencies indicates that the capacitor is being protected by the spark gap, which limits the peak voltage appearing across the plates of the capacitor. Slight changes in the return loss are due to the carbon residue formed between the surge electrodes during the arc over owing to the conductivity of carbon. These changes in the RF performance of the circuit are not detrimental to the operation of the circuit. However, without the surge protection of the spark gap, capacitors exposed to high voltage surges are likely to explode or crack, or otherwise be damaged. This interrupts the operation of the associated circuit severely. Spark gap surge protection allows the use of capacitors with lower working voltage 5 (500 volts, for example) to be used. Such capacitors are smaller in size than the typical capacitors of 1 kilovolt, which is the minimum voltage without spark gap. The ability provided by use of the present embodiments is an important factor in determining the minimum cavity size of a splitter housing, for example.

The parameter that is most important to the functionality of the circuit from a user point of view is the insertion loss. This is a measurement of the amount of signal that is lost as the signal travels through the circuit. The return loss is a measurement of the ratio of the incident wave to its reflection. As the impedance of the circuit approaches the characteristic impedance of the medium (75 ohms, for example), the return loss decreases toward an infinite value at exactly 75 ohms. This indicates that none of the incident signal is lost to reflection. This can occur at any frequency. This parameter is sensitive to subtle changes in the nature of the transmission path which could arise from carbon deposits caused by a spark or by the erosion of the transmission path. The isolation is a measure of the separation of the outputs. Signals injected into one output are attenuated from another output by phase cancellation. The measurement of this attenuation reveals the isolation parameter with respect to frequency. Changes in the impedance of the circuit 8 from input 10 to outputs 12 and 14 affect the isolation signature over the operating frequency range of the circuit. Surge effects are often seen in the low frequency isolation performance due to damage to the associated coupling capacitor (C1, in this example).

The tables of FIGS. 15 to 17, and 21 to 23 are associated with the graphs showing the RF (radio frequency) parameters associated with the input port 10 and output ports 12 and 14 at various frequencies. Insertion loss is the signal loss from the input port 10 to ports 12 and port 14. The return loss is the logarithm of the ratio of the reflected signal to the incident signal at each port. The isolation is the attenuation of the signal between ports 1 and 2. All signal losses are expressed in decibels. The graphs give a pictorial representation of the tables with respect to the signal frequency in Megahertz.

For all embodiments of the invention, it was observed from prototype tests that a spark gap range from 0.5 mm to 1.0 mm was operable to protect coupling capacitors at an input or output port from surge voltage. The preferred gap was determined to be 0.8 mm. For each embodiment, it was also determined that the thickness of the surge rods 17, 30, clip electrodes 34, and eyelets 46, 60 must be sufficient to insure long-term reliability. Also, although tin-plated brass material was used for each embodiment, other suitable material can be used. Further note that the material thickness must be controlled to insure long term reliable surge protection. In the prototypes the diameter or thickness of surge rods 16, 17, and 30 was 1.2 mm, and of clip electrode 34 was 0.5 mm. The dimensioning of eyelets 46 and 60 is given above.

Although various embodiments of the present invention have been shown and described, they are not meant to be limiting. Those of skill in the art may recognize certain modifications to these embodiments, which modifications are meant to be covered by the spirit and scope of the following claims. The present embodiments of the invention have been described hereon in association with a cable television splitter circuit, as an example, but the present invention is not to be so limited, and is applicable for use with any electrical or electronic devices that require surge voltage protection. Such other devices, for example, may include amplifiers, filters, directional couplers, and so forth.

What is claimed is:

1. In an electronic device including at least one input port, and at least one output port, a system is provided for protecting at least one of a plurality of electrical circuit connection points individually associated with one or more of said input port and said output port, respectively, from surge voltages, comprising:
    a housing of said device fabricated from electrically conductive material, said housing being electrically connected to ground, said plurality of electrical circuit connection points being located within said housing; and
    at least one elongated rod of electrically conductive material positioned within said housing between an individual one of said plurality of electrical circuit connection points and said housing to provide a spark gap therebetween, for conducting voltage surges occurring at said associated electrical circuit connection point to ground, thereby preventing damage to electrical circuitry connected to said associated electrical circuit connection point.

2. The system of claim 1, wherein said at least one elongated rod has one end secured to and electrically conductive with an interior surface of said housing, and a free end spaced apart from and opposing said individual one of said electrical circuit connection points for forming said spark gap therebetween.

3. The system of claim 1, wherein said at least one elongated rod has one end secured to and electrically conductive with said said individual one of said electrical circuit connection, points, and a free end spaced apart from and opposing an interior surface of said housing for forming said spark gap therebetween.

4. In an electronic device including at least one input port, and at least one output port, a system is provided for protecting at least one of a plurality of electrical circuit connection points individually associated with one or more of said input port and said output port, respectively, from surge voltages, comprising:
    a housing of said device fabricated from electrically conductive material, said housing being electrically connected to ground, said plurality of electrical circuit connection points being located within said housing;
    at least one electrically conductive surge member positioned within said housing between an individual one of said plurality of electrical circuit connection points and said housing to provide a spark gap therebetween, for conducting voltage surges occurring at said associated electrical circuit connection point to ground, thereby preventing damage to electrical circuitry connected to said associated electrical circuit connection point;
    a printed circuit board (PCB) mounted within said housing, wherein said at least one electrical circuit connection point is located on said PCB; and
    said at least one electrically conductive surge member including an electrically conductive strip secured to an edge of said PCB, and electrically connected to said at least one electrical circuit connection point, said electrically conductive strip being positioned in opposition to and spaced from an interior wall of said housing for forming a spark gap therebetween.

5. In an electronic device including at least one input port, and at least one output port, a system is provided for protecting at least one of a plurality of electrical circuit connection points individually associated with one or more of said input port and said output port, respectively, from surge voltages, comprising:
    a housing of said device fabricated from electrically conductive material, said housing being electrically connected to ground, said plurality of electrical circuit connection points being located within said housing;
    at least one electrically conductive surge member positioned within said housing between an individual one of said plurality of electrical circuit connection points and said housing to provide a spark gap therebetween, for conducting voltage surges occurring at said associated electrical circuit connection point to ground, thereby preventing damage to electrical circuitry connected to said associated electrical circuit connection point;
    a printed circuit board (PCB) mounted within said housing, wherein said at least one electrical circuit connection point is located on said PCB; and
    said at least one electrically conductive surge member including an electrically conductive eyelet secured to a top or bottom portion of said PCB, and electrically connected to said at least one electrical circuit connection point, said electrically conductive eyelet having an edge portion positioned in opposition to and spaced from an interior wall of said housing for forming a spark gap therebetween.

6. In an electronic device including at least one input port, and at least one output port, a system is provided for protecting at least one of a plurality of electrical circuit connection points individually associated with one or more of said input port and said output port, respectively, from surge voltages, comprising:
    a housing of said device fabricated from electrically conductive material, said housing being electrically connected to ground, said plurality of electrical circuit connection points being located within said housing;
    at least one electrically conductive surge member positioned within said housing between an individual one of said plurality of electrical circuit connection points and said housing to provide a spark gap therebetween, for conducting voltage surges occurring at said associated electrical circuit connection point to ground, thereby preventing damage to electrical circuitry connected to said associated electrical circuit connection point;
    a printed circuit board (PCB) mounted within said housing, wherein said at least one electrical circuit connection point is located on said PCB; and
    said at least one electrically conductive surge member includes electrically conductive first and second eyelets mounted upon said PCB, and spaced apart to form a spark gap therebetween, wherein said first eyelet is electrically connected to said at least one electrical circuit connection point, and said second eyelet is electrically connected to said housing for grounding.

* * * * *